United States Patent [19]
Chen

[11] Patent Number: 5,969,849
[45] Date of Patent: Oct. 19, 1999

[54] OPTICAL DEVICE OF ENHANCED OPTICAL ISOLATION AT VARIOUS WAVELENGTHS

[76] Inventor: Qushan Chen, P.O. Box 5621, San Mateo, Calif. 94402

[21] Appl. No.: 09/008,397

[22] Filed: Jan. 17, 1998

[51] Int. Cl.$^6$ .............................. G02B 26/08; G02F 1/09
[52] U.S. Cl. .......................... 359/304; 359/280; 359/283
[58] Field of Search ................................. 359/280, 281, 359/282, 283, 284, 304

[56] References Cited

U.S. PATENT DOCUMENTS

| | | | |
|---|---|---|---|
| 5,111,330 | 5/1992 | VanDelden et al. | 359/281 |
| 5,602,673 | 2/1997 | Swan | 359/281 |
| 5,661,829 | 8/1997 | Zheng | 385/33 |

Primary Examiner—Georgia Epps
Assistant Examiner—Suzanne Letendre

[57] ABSTRACT

An optical isolator comprises two polarizers arranged before and after an optical rotator and a magnet surrounds the optical rotator. The magnet may generate a magnet field with a direction in spatial space parallel to the propagation direction of light traveling in the optical rotator and a strength sufficient to rotate the light to a predetermined rotation angle. Preferably, the polarizers are birefringent wedges of identical shape and optical properties. The magnet in accordance with the present invention may have a pair of magnetic adapters to generate the desired direction and strength of magnetic field. The direction of magnetic field varies in three-dimension space as the magnet is adjusted. The present invention provides an optical isolator of high isolation for high-volume mass production at a low cost. In particular, it may be easily operated at different wavelengths to achieve desired isolation without sacrifice of other optical properties of the optical isolator.

35 Claims, 7 Drawing Sheets

THE PRESENT INVENTION

Production Volume Frequncy vs. Isolation

OPTICAL DEVICE OF ENHANCED OPTICAL ISOLATION AT VARIOUS WAVELENGTHS

BACKGROUND OF THE INVENTION

The present invention relates to optical devices and, in particular, to optical isolators.

In fiber optical communication systems, one concern is reflection induced by feedback of a light signal. The reflection causes noise which in turn, can degrade performance of communication. Usually, optical devices, such as optical isolators or circulators, are employed to prevent reflection. An optical isolator or circulator acts as an one way valve for a light signal, allowing the transmission of forward light and especially useful in preventing backward light. An important index to evaluate the performance of such an optical device is its ability to isolate the backward light.

These nonreciprocal optical devices for providing isolation are based on Faraday's discovery in accordance with which, the plane of polarized light rotates while passing through glass that is contained in a magnetic field. The amount of rotation is dependent upon (1) the component of the magnetic field parallel to the direction of light propagation, (2) the path length in the optical material, and (3) the ability of the magneto-optic material to rotate the polarization plane as expressed by the Verdet constant.

An optical isolator in its simplest form consists of a first polarizer, a Faraday rotator contained in a magnet configured so that the lines of flux are along the axis of the rotator and thus parallel to the direction of light propagation, and a second polarizer.

The performance of the optical devices is primarily defined by backward loss (the ability to block reflected light and commonly referred to as "isolation"). There are two different designs to achieve isolation. One of them is composed of a polarizer, a rotator, and an analyzer. In such a design, whether it succeeds in suppressing back-reflection mainly relies on the extinction ratio of the polarizer and the analyzer, reflected stray light from the individual elements, and the accuracy and stability of the 45° Faraday rotator. In the other design that is commonly used in current optical isolators to reach a higher isolation, the polarizers arranged before and after the Faraday rotator are two birefringent wedges of the same shape. The birefringent wedges spatially separate the ordinary and extraordinary beams from each other in the backward direction so that both miss the entrance into the input fiber pigtail.

An optical isolator 100 of prior art usually comprises a first birefringent wedge 102, an optical rotator 104 surrounded by a magnet 106, and a second birefringent wedge 108, as shown in FIG. 1. Backward light beam 110 from an optic fiber (not shown) propagates along a direction parallel to the axis 112 of optical rotator 104 before entering into the first birefringent wedge 102. The first birefringent wedge 102 separates the light beam 110 into an extraordinary ray and an ordinary ray. Also, the first birefringent wedge 102 causes the propagation direction of light beam 110 slightly refracted. Another reason that may also result in the propagation direction of light beam 110 refracted is inaccurate installation of birefringent wedge 102 during assembling. Due to the slanted surface of first birefringent wedges 102 and/or its inaccurate installation, the propagation direction of the light beam 110 is deflected from the axis 112 of optical rotator 104 in spatial space after it enters into the first birefringent wedge 102. However, a magnetic field 120 directed parallel to the axis 112 of the optical rotator 104 may not at this time parallel to direction 118 of light beam, which affects the amount of rotation that is dependent upon the component of the magnetic field parallel to the direction of light propagation. Accordingly, it is difficult for the prior art optical isolators to achieve high isolation.

U.S. Pat. No. 5,111,330 to VanDelden et al., "VanDelden herein", disclosed a method by which the position of a magnet with respect to the optical rotator is adjusted along a direction parallel to the axis of the magnet, so as to vary the magnetic field strength applied to the optical rotator.

U.S. Pat. No. 5,602,673 to Swan, "Swan herein", taught an optical isolator in which an input transmission element has a beveled surface that is parallel to the surface of the first birefringent wedge in order to force the light traveling in the first birefringent wedge along the axis of the optical rotator.

U.S. Pat. No. 5,661,829 to Zheng, "Zheng herein", referred to adjust the orientation of the first polarizer and the second polarizer so that the isolation peak position can be modified.

Those prior art optical isolators focuses on only variation of the magnetic field strength or a saturated magnetic field strength that leads a light beam within the optical rotator of the optical isolator to be rotated to a proper extent, and the adjustment is simply conducted on two-dimension plane rather than in a three-dimension space, so the requirement that the propagation direction of a light beam shall be parallel to the direction of the magnetic field is not satisfied. Also, since the polarizers are too small in size to be accurately adjusted manually, the efforts to achieve high isolation by manually adjusting the orientation of the polarizer is a random process without a definite pattern, so it closely associates with experience.

Most importantly, prior art optical isolators ignore such a point that in order to achieve a high isolation, the direction of magnetic field and light propagation should be parallel. To achieve this aim in practical operation, the amount of rotation of Faraday rotator has to be adjusted to a proper extent relative to orientation of the two polarizers. Specifically, all three conditions discovered by Faraday must be met to obtain an optimum rotation to achieve a high isolation. The requirement that light propagation should be parallel to the direction of magnetic field also determines the accuracy of optical rotators.

Currently, these optical devices are subjected to several constrains. Only fewer than 30% of the devices so constructed can achieve an isolation higher than 40 dB at a fixed single operating wavelength in high-volume mass production. Furthermore, while wavelength is adjustable in prior art optical isolator, the isolation is lower than the value commonly required with the complexity of manufacturing. Thus, prior art optical isolators render a relatively low isolation on an average at a predetermined wavelength in high-volume mass production.

Therefore, what is needed is an optical device that optimizes the isolation at various wavelengths. Specifically, both direction and strength of the magnetic field of the optical device are adjustable in three-dimension space and preferably, the direction of the magnetic field is parallel to the direction of light propagation in three-dimension space.

SUMMARY OF THE INVENTION

An optical device in accordance with the present invention comprises at least one first polarizer for polarizing light beam and/or spatially separating its components; the light beam propagates along a first direction before entering into the first polarizer and along a second direction after traveling through the first polarizer; an optical rotator for rotating the polarized light beam from the first polarizer to a predetermined rotation angle; a magnet surrounding the optical rotator for generating a magnetic field with its direction parallel to the second direction; and a second polarizer for polarizing and/or recombining or further deviating the rotated light beam. Preferably, the polarizers are birefringent wedges of identical shape and optical properties.

A magnet in accordance with the present invention generates a magnetic field strength of trapezoid in spatial space. This magnetic field strength is distributed parallel to the second direction rather than axis of the optical rotator, and its flux direction varies in three-dimension space as the magnet is adjusted. Preferably, saturated magnetic field strength is applied crossover the optical rotator along the second direction. The magnet may be rotated directly over the optical rotator without axis displacement to adjust its flux direction and strength of the magnetic field.

Preferably, the magnet in accordance with the present invention is a magnetic bushing around the optical rotator. In order to obtain a wide range of saturated magnetic field strength and the magnetic field direction parallel to the second direction, at least one magnetic adapter is attached to the magnet. Preferably, a pair of magnetic adapters are attached to opposite sides of the magnetic bushing. The pair of magnetic adapters may be symmetrically arranged along the axis of the magnetic bushing so that saturated magnetic field strength may be applied crossover the optical rotator along the second direction.

In accordance with the present invention, a method of rotating a light beam transmitted along a first direction comprises steps of polarizing and/or spatially separating components of the light beam so that the light beam after polarization propagates along a second direction; providing a magnetic field parallel to the second direction; and rotating the polarized light beam to a predetermined rotation angle. The method further comprises a step of rotating the magnet without displacement along its axis to adjust the direction of the magnetic field.

With the adjustment of the magnet, the direction and strength of magnetic field varies relative to the second direction and the angle between the magnetic field direction and the second direction changes, which in turn, results in the change of the rotation angle of optical rotator. Thus, high isolation achieves. Furthermore, different rotation angles lead to different operation wavelength tuning. The present invention provides an optical device of high isolation at tunable operation wavelengths. In particular, it may be easily operated at different wavelengths with a desired isolation but is not at sacrifice of other optical properties (such as insertion loss) of the optical device. These and other features and advantages of the present invention are apparent from the description below with reference to the following drawings.

DESCRIPTION OF THE PREFERRED EMBODIMENTS

The present invention recognizes that a desired isolation may be achieved if backward light beam is rotated to an extent so that it can not return to the input fiber pigtail. To realize it, a magnetic field with its flux line direction parallel to propagation direction of the backward light beam has to be generated so that the amount of rotation of light beam is subjected to be accurately controlled.

Figure 1:
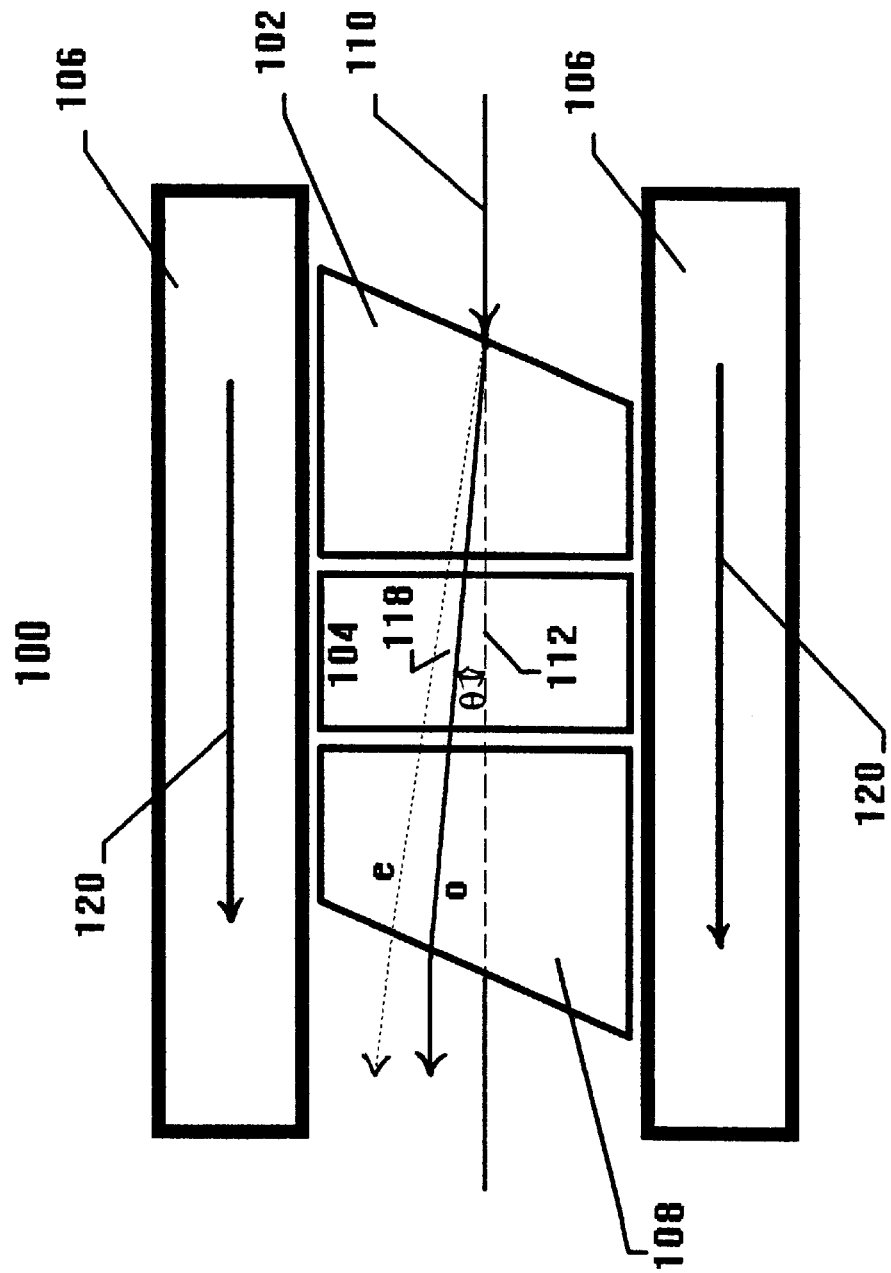
FIG. 1 is a representational diagram of an optical isolator in the prior art.
Figure 2:
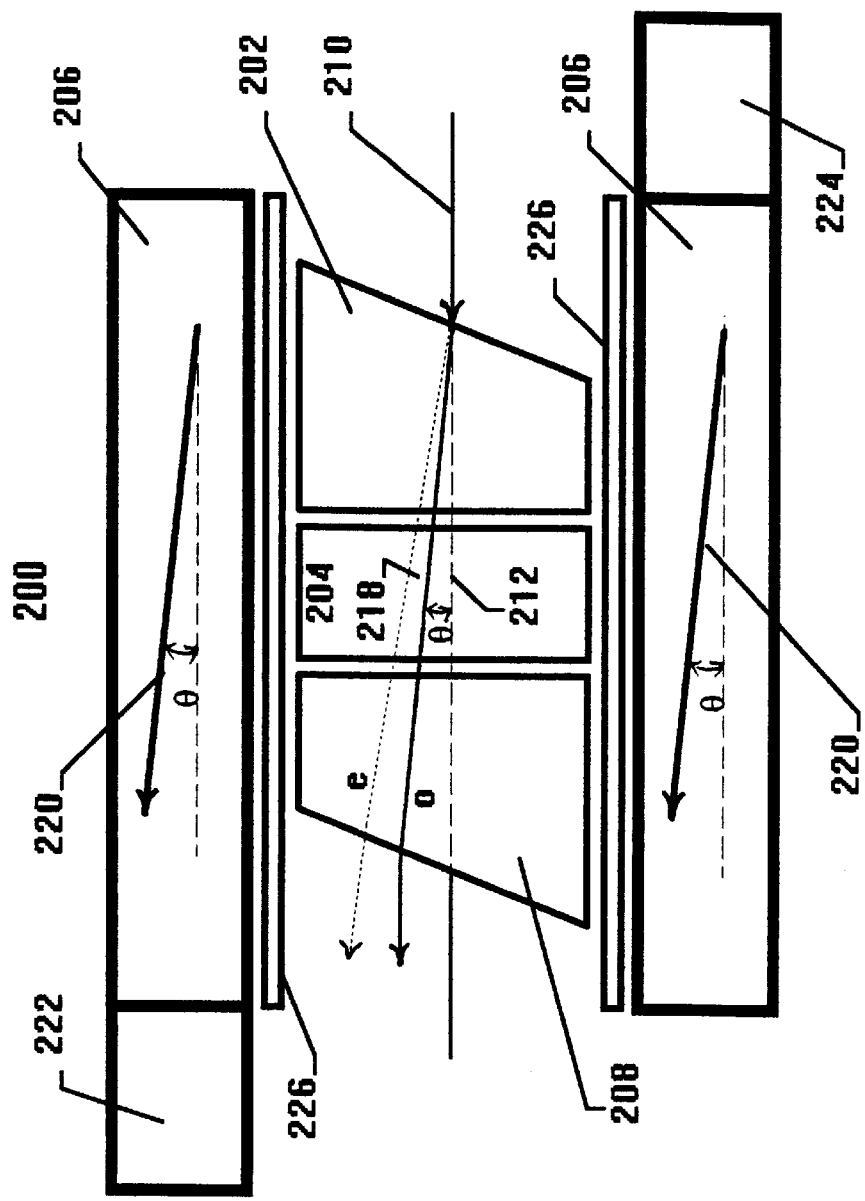
FIG. 2 illustrates an optical isolator in accordance with the present invention.

An optical isolator 200 in accordance with the present invention includes a first birefringent wedge 202, an optical rotator 204 surrounded by the magnet 206 with a pair of magnetic adapters 222 and 224, and a second birefringent wedge 208, as shown in FIG. 2. In accordance with one preferred embodiment of the present invention, a magnetic field with its direction 220 parallel to the direction that the light beam propagates in spatial space is provided by magnet 206 of a pair of magnetic adapters 222 and 224. Typically, a nonmagnetic bushing 226 may be arranged between the magnet 206 of a pair of magnetic adapters 222 and 224 and the optical rotator 204.

Light beam 210 propagates along a direction parallel to the axis 212 of optical rotator 204 before entering into the first birefringent wedge 202. The first birefringent wedge 202 polarizes light beam 210 and/or spatially separates its components into an extraordinary ray and an ordinary ray. Due to the slanted surface and/or inaccurate installation of first birefringent wedge 202, the propagation direction of the light beam 210 is deflected from the axis 212 of optical rotator 204, so that an angle of θ is created in spatial space after the light beam 210 enters into the first birefringent wedge 202. The direction 220 of the magnetic field generated by the magnet 206 of a pair of magnetic adapters 222 and 224 is directed parallel to the deflected propagation direction 218.

During the light beam traveling along the deflected transmission direction 218, the optical rotator 204 may provide proper rotation of the light beam if the direction of a saturated magnetic field is parallel to the deflected propagation direction 218. The light beam rotated by the optical rotator 204 then enters into the second birefringent wedge 208 which polarizes it again and/or further spatially separates the extraordinary ray 214 and the ordinary ray 216. As a result, the backward light beam after traveling through the second birefringent wedge 208 is walked off the direction of a forward light beam and misses the entrance into the input fiber pigtail. Thus, enhanced high isolation is achieved.

Figure 3:
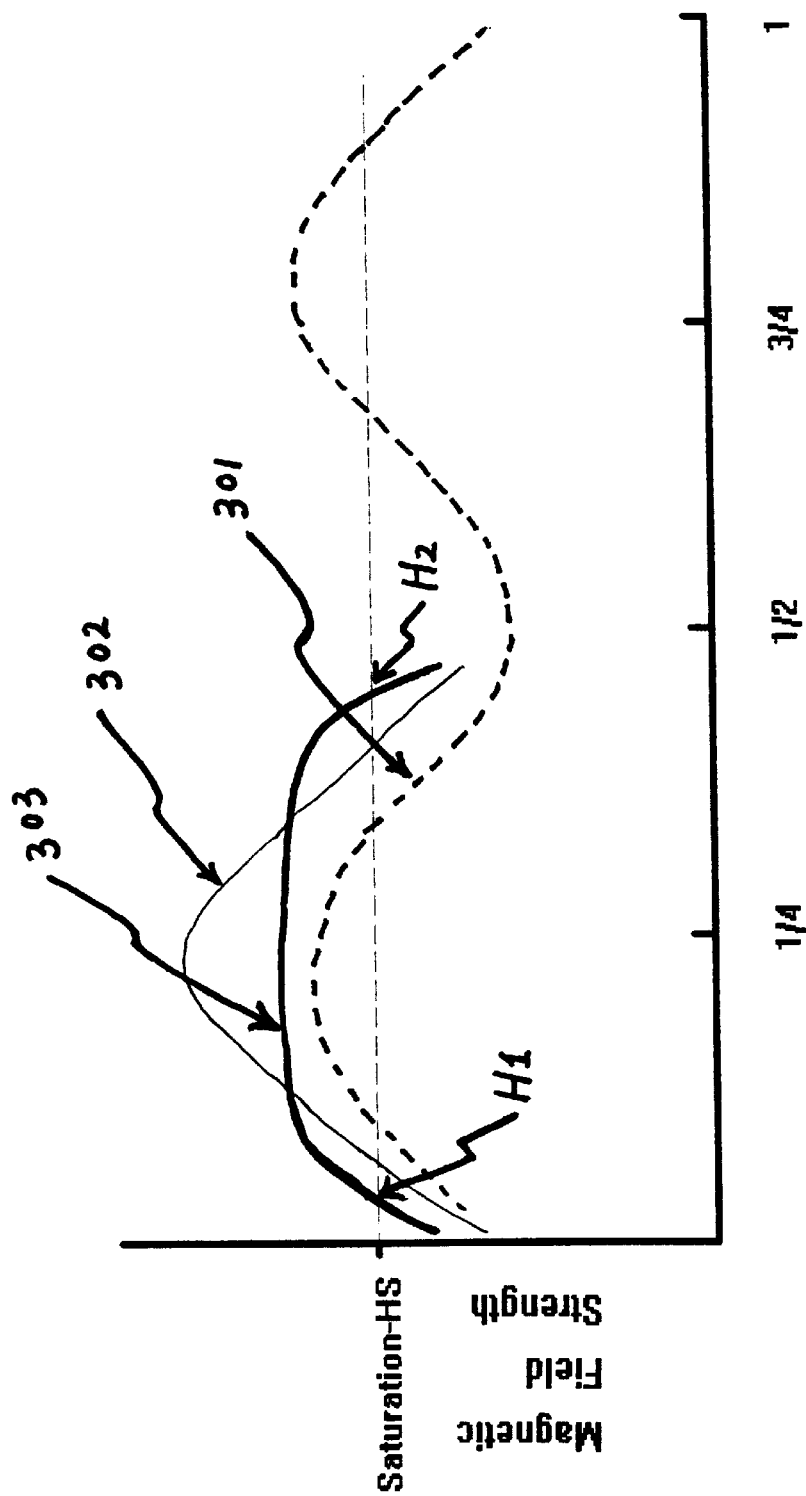
FIG. 3 is a graph illustrative of variation of magnetic field strength versus the fraction of trial distance along the cylindrical axis of a permanent magnet.

FIG. 3 is a graphic in which shows different variation of the magnetic field strength along the cylindrical axis of a permanent magnet. The saddle curve 301 shows the variation of the magnetic field strength generated by the prior art permanent magnet along its cylindrical axis. The present invention provides a high magnetic field strength by shortening a magnet, as indicated by 302. Furthermore, with a pair of magnetic adapters 222 and 224 attached, magnet 206 generates saturated magnetic field strength H over saturated value $H_s$ within a wide range from $H_1$ to $H_2$, as shown by trapezoid curve 303. This magnetic field strength ensures the accuracy and stability of the rotation. Thus, when the magnet in accordance with the present invention is employed in an optical isolator, a magnetic field which strength is higher than saturation and which direction is parallel to that of light propagation is applied crossover the optical rotator. Consequently, a saturated magnetic field strength with its direction parallel to the light beam traveling through the optical rotator significantly and steadily enhances the performance of isolation of the optical isolator in accordance with the present invention.

In accordance with one embodiment of the present invention, the magnet 206 used in optical isolator 200 may be an one with predetermined magnetic field strength and direction. Furthermore, only one magnetic adapter may be attached to the magnet to adjust the direction and strength of the magnetic field applied to the optical rotator 204.

Preferably, magnet 206 is a cylindrical tube surrounding the optical rotator 204 and magnetic adapters 222 and 224 are of the same shape. Magnetic materials to make the magnetic adapters may be the materials same as or different from magnet 206. Both of magnetic adapters are symmetrically attached to opposite sides of the magnet 206 along the axis of the magnet 206. With the change of the shape and size of the pair of magnets 222 and 224, the direction and strength of the magnetic field become varied. Of course, magnetic adapters 222, 224, and magnet 206 may be integrated into one magnet.

Also, more than two magnetic adapters may be symmetrically or unsymmetrically attached to or integrated with magnet 206 to perform fine tuning of magnetic field strength and direction. A magnet with its magnetic field direction not parallel to its axis may be used to achieve the aim of the present invention. It is known for the person skilled at this field that the purpose of the magnetic adapter is to adjust the magnetic field direction and strength and it may be implemented with a variety of means.

In accordance with another embodiment of the present invention, the direction and strength of magnetic field may be flexibly and finely adjusted in a three-dimension space by rotating magnet 206 with magnetic adapters 222 and 224 over the optical rotator 204. Preferably, this adjustment may be implemented without any displacement along the axis 212 of the optical rotator 204. Therefore, the rotation of the magnet 206 with magnetic adapters 222 and 224 over the optical rotator 204 may adjust its magnetic field direction and strength in spatial space, which in turn, may greatly enhance the isolation of the optical isolator.

In accordance with the preferred embodiment of the present invention, with the rotation of the magnet 206 with magnetic adapters 222 and 224 over the optical rotator 204, the direction of magnetic field is continually changed in three-dimension space relative to the propagation direction of light, which therefore causes rotation angle of optical rotator 204 changed. As a result of the change of rotation angle, the peak isolation of optical isolator is shifted for different wavelengths. Accordingly, the operation wavelength of the optical isolator may also be adjusted by rotating the magnet in accordance with the present invention.

Figure 4:
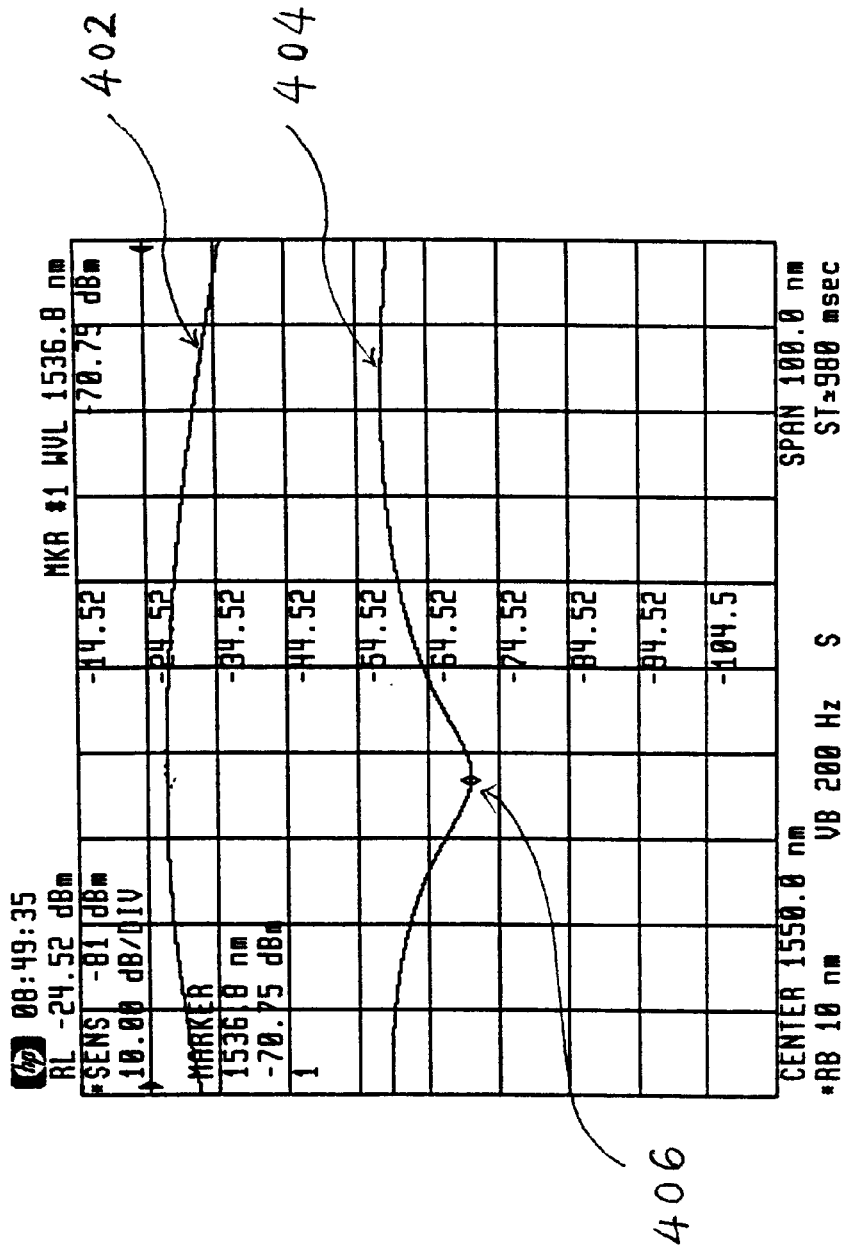
FIGS. 4–6 are test reports showing peak point of isolation shifts at different wavelengths as the magnet rotates.
Figure 5:
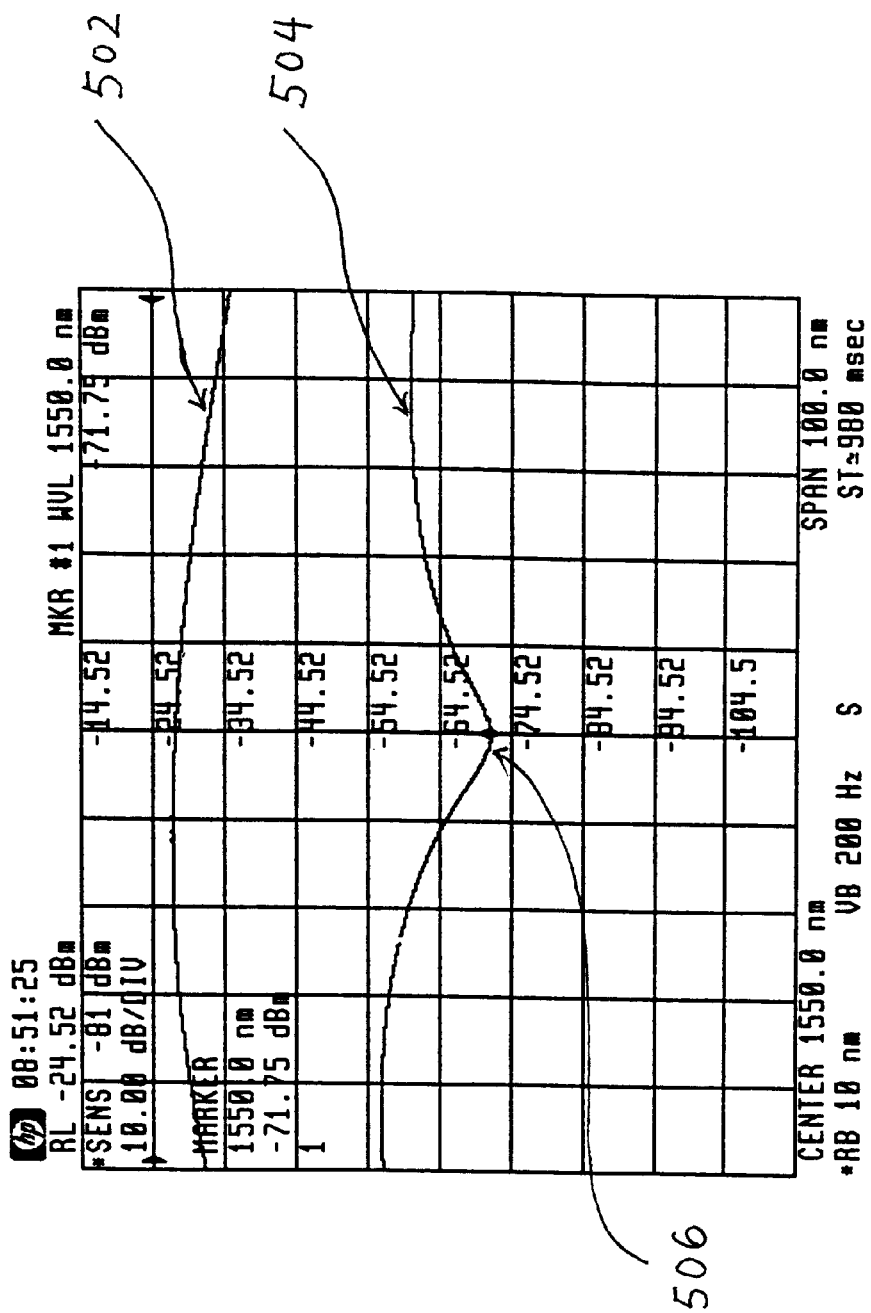
Figure 6:
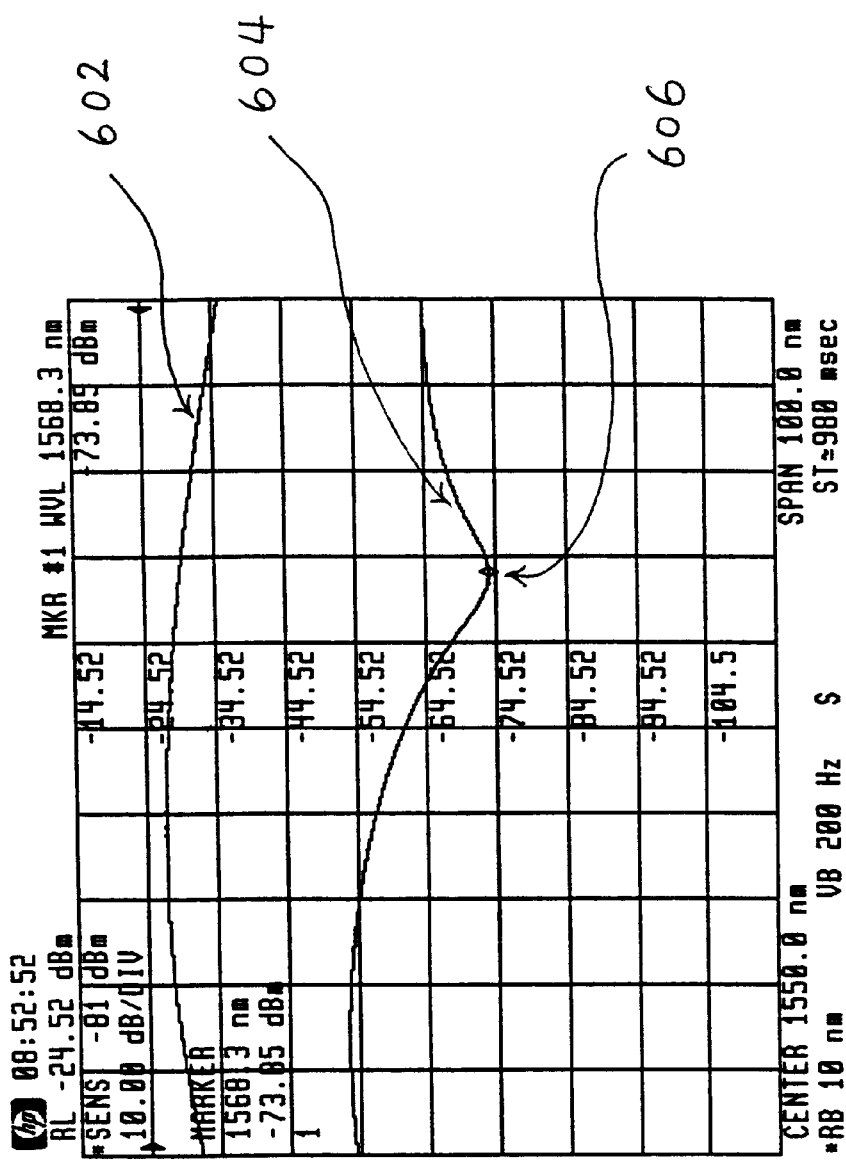

A test on the peak isolation at different wavelengths was made for the optical isolator in accordance with the present invention with HP-71450B Optical Spectrum Analyzer. FIGS. 4–6 are printed spectrum test reports showing the variation of peak isolation wavelengths with the rotation of the magnet in accordance with the preferred embodiment of the present invention. Curve 402 represents light source and curve 404 shows that the isolation distribution of the optical isolator in accordance with the present invention is applied to the light source. FIG. 4 shows that the isolation peak point 406 is at the wavelength of 1536 nm. The isolation may be calculated by the value (about −70 dB) of the peak point 406 of curve 404 minus the value (about −26 dB) at the corresponding point of light source curve 402. Thus, the calculated isolation is about 44 dB at wavelength 1536 nm. Furthermore, with rotation about 90° or 270° of the magnet from its original position, the isolation peak point 506 shifts to the wavelength of 1550 nm, as shown in FIG. 5. In case the magnet in accordance with the preferred embodiment is rotated about 180°, the isolation peak point 606 shifts to the wavelength of 1568 nm, as shown in FIG. 6.

In any cases shown above, it is proved an identical isolation of about 44 dB has been achieved at different wavelengths with the optical isolator in accordance with the preferred embodiment of the present invention. Therefore, the present invention provides an optical isolator that is able to provide a high isolation at different wavelengths.

Figure 7:
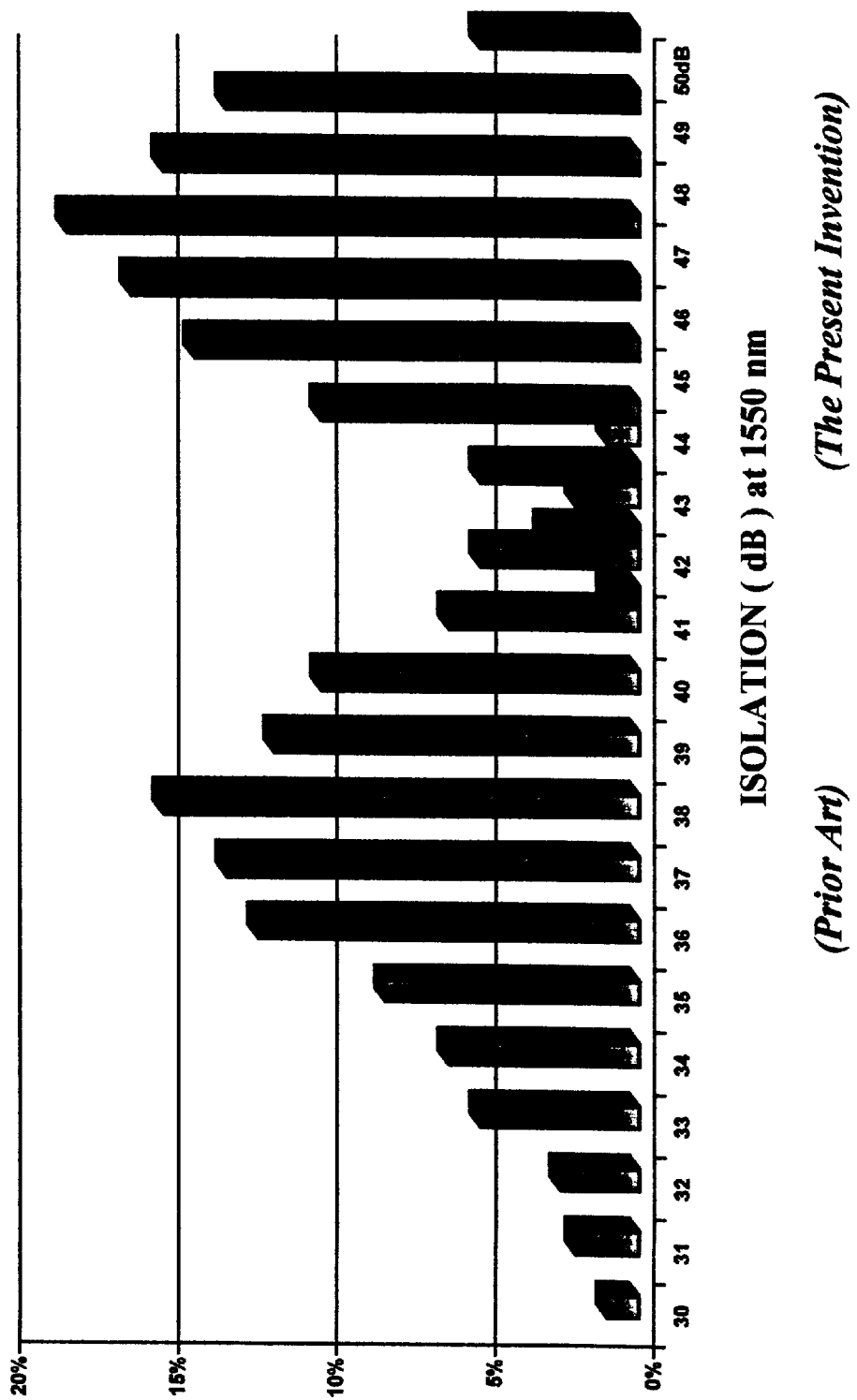
FIG. 7 is a graphic showing distribution frequency of production volume versus isolation at wavelength of 1550 nm.

The optical isolators in accordance with the present invention significantly enhance the isolation. Referring to FIG. 7, the graph shows production volume frequency versus isolation at the wavelength of 1550 nm. The isolation distribution frequency of production volume of prior art optical isolators is between 30 dB and 43 dB while the isolation distribution frequency of production volume of optical isolators in accordance with the present invention is between 42 dB and 50 dB. Specifically, only less than 30% of the total production volume of prior art optical isolators are of an isolation higher than 40 dB. However, almost 95% of the total production volume of optical isolators in accordance with the present invention are of an isolation higher than 42 dB. This is a great improvement in isolation performance from prior art optical isolators. In other words, the isolation of the optical isolators in accordance with the present invention is enhanced by additional 5–15 dB comparing to the prior art optical isolators.

It will be understood that the previous descriptions and explanations are given by way of example, and that numerous changes in the combinations of elements and functions as well as changes in design may be made without departing from the spirit and scope of the invention as hereinafter claimed. These and other modifications to and variations upon the embodiments described above are provided for by the present invention, the scope of which is limited only by the following claims.

I claim:

1. An optical device comprising:
   at least one polarizer for polarizing and/or spatially separating components of a light beam, said light beam propagating along a first direction before entering into said polarizer and along a second direction after traveling through said polarizer;
   an optical rotator for rotating the light beam from said polarizer to a predetermined angle; and
   a magnetic element surrounding said optical rotator for generating a magnetic field with its flux direction parallel to the second direction.

2. An optical device as recited in claim 1 wherein the first direction is not parallel to the second direction.

3. An optical device as recited in claim 2 wherein the strength of said magnetic field is distributed along the second direction and is varied in spatial space as said magnetic element is rotated over said optical rotator without axis displacement.

4. An optical device as recited in claim 2 wherein the direction of said magnetic field is varied in spatial space as said magnetic element is adjusted over said rotator.

5. An optical device as recited in claim 4 wherein said magnetic element is rotated over said rotator to achieve a peak isolation at a predetermined wavelength.

6. An optical device as recited in claim 4 wherein said magnetic element is rotated over said rotator to achieve peak isolation at different wavelengths.

7. An optical device as recited in claim 4 wherein said magnetic element is cylindrical in shape.

8. An optical device as recited in claim 1 wherein said polarizer is a birefringent wedge.

9. An optical device as recited in claim 1 wherein the flux direction is parallel to the direction that the light beam propagates in said optical rotator.

10. An optical device comprising:
   at least one polarizer for polarizing and/or spatially separating components of a light beam, said light beam propagating along a first direction before entering into said polarizer and along a second direction after traveling through said polarizer;
   an optical rotator for rotating the light beam from said polarizer to a predetermined angle; and
   a magnetic element surrounding said optical rotator for generating a magnetic field with its flux direction parallel to the second direction and its magnetic field strength distributed within said magnetic element in a form of trapezoid.

11. An optical device as recited in claim 10 wherein the flux direction is parallel to the direction that the light beam propagates in said optical rotator.

12. An optical device comprising:
   at least one birefringent wedge for polarizing and/or spatially separating components of a light beam, said light beam propasating along a first direction before entering into said birefringent wedge and along a second direction after traveling through said birefringent wedge;
   an optical rotator for rotating the light beam from said birefrinent wedge to a predetermined angle;
   a magnetic element surrounding said optical rotator for generating a magnetic field with its flux direction parallel to the second direction; and
   at least one magnetic adapter attached to said magnetic element to have the direction of said magnetic field aligned with the second direction.

13. An optical device as recited in claim 12 further comprising a pair of magnetic adapters attached to opposite sides of said magnetic element.

14. An optical device as recited in claim 13 wherein said pair of magnetic adapters are symmetrically arranged along the axis of said magnetic element.

15. An optical device as recited in claim 14 further having a non-magnetic bushing arranged between said magnet element and said optical rotator.

16. An optical device as recited in claim 13 wherein a saturated magnetic field strength is applied crossover said optical rotator along said second direction.

17. An optical device as recited in claim 12 wherein the flux direction is parallel to the direction that the light beam propagates in said optical rotator.

18. An optical isolator comprising:
   a first polarizer for polarizing a light beam propagated along a first direction, said light beam being deviated from the first direction by said first polarizer so that the light beam after traveling through said first polarizer propagates along a second direction;
   an optical rotator for rotating the light beam from said first polarizer to a predetermined rotation angle;
   means surrounding said optical rotator for generating a magnetic field with its direction parallel to the second direction; and
   a second polarizer for polarizing the rotated light beam.

19. An optical isolator as recited in claim 18 wherein the direction and strength of said magnetic field are distributed along the second direction and varied in spatial space as said means is adjusted over said rotator.

20. An optical isolator as recited in claim 19 wherein said means is rotated directly over said optical rotator without displacement along the axis of said magnet.

21. An optical isolator as recited in claim 20 wherein said means is rotated over said rotator to achieve a peak isolation at a predetermined wavelength.

22. An optical isolator as recited in claim 19 wherein a rotation angle of the optical rotator is varied as said magnetic field strength and direction are adjusted.

23. An optical isolator as recited in claim 22 wherein said means is a magnetic bushing on said optical rotator.

24. An optical isolator comprising:
   a first polarizer for polarizing a light beam propagated along a first direction, said light beam being deviated from the first direction by said first polarizer so that the light beam after traveling through said first polarizer propagates along a second direction;
   an optical rotator for rotating the light beam from said first polarizer to a predetermined rotation angle, said predetermined rotation angle being varied as said magnetic field strength and direction are adjusted;
   a magnetic bushing on said optical rotator for generating a magmetic field having a direction and a strength, said direction being parallel to the second direction, said strength being essentially distributed within said magnetic bushing in a form of trapezoid, the direction and strength being distributed along the second direction and varied in spatial space as said magnetic bushing is adjusted over said rotator; and
   a second polarizer for polarizing the rotated light beam.

25. An optical isolator as recited in claim 24 further comprising at least one magnetic adapter attached to said magnetic bushing along the axis of said magnetic bushing to have the direction of said magnetic field aligned with the second direction.

26. An optical isolator as recited in claim 25 further comprising a pair of magnetic adapters attached to opposite sides of said magnetic bushing along the axis of said magnetic bushing to have the direction of said magnetic field aligned with the second direction.

27. An optical isolator as recited in claim 26 wherein said pair of magnetic adapters are symmetrically arranged along the axis of said magnetic bushing.

28. An optical isolator as recited in claim 27 wherein a saturated magnetic field strength is applied crossover said optical rotator along said second direction.

29. An optical isolator as recited in claim 28 wherein said first polarizer and second polarizer are birefringent wedges of identical shape and optical property.

30. An optical device as recited in claim 27 further having a non-magnetic bushing arranged between said magnet element and said optical rotator.

31. In a method of rotating a light beam transmitted along a first direction by an optical rotator, said optical rotator being enclosed within a magnet, said method comprising the steps of:
   polarizing said light beam so that the light beam after polarization is not only polarized, but also propagates along a second direction, said first direction being not parallel to said second direction;
   providing a magnetic field with its flux direction parallel to said second direction; and rotating the polarized light beam to a predetermined rotation angle.

32. A method as recited in claim 31 further comprising a step of rotating said magnet without displacement along the axis of said optical rotator to adjust the direction of said magnetic field in spatial space.

33. A method as recited in claim 32 further comprising a step of adjusting the direction of said magnetic field to vary the predetermined rotation angle.

34. A method as recited in claim 31 further comprising a step of rotating said magnet without displacement along the axis of said optical rotator to achieve a peak isolation at a predetermined wavelength.

35. A method as recited in claim 34 further comprising a step of applying a saturated magnetic field crossover said optical rotator along said second direction.

* * * * *